May 28, 1929. H. E. VON GRIMMENSTEIN 1,715,020
BATTERY PLATE ASSEMBLY BURNING RACK
Filed Dec. 27, 1927
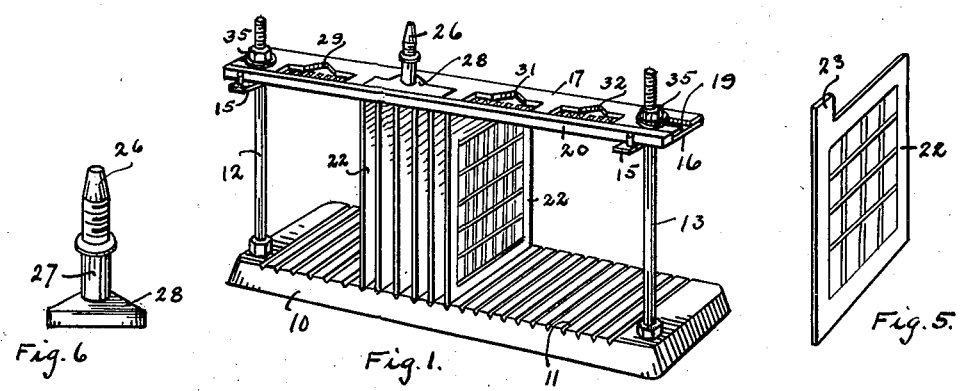
INVENTOR,
Henry E. Von Grimmenstein,
By Minturn + Minturn,
Attorneys.

Patented May 28, 1929.

1,715,020

UNITED STATES PATENT OFFICE.

HENRY E. von GRIMMENSTEIN, OF INDIANAPOLIS, INDIANA.

BATTERY-PLATE-ASSEMBLY BURNING RACK.

Application filed December 27, 1927. Serial No. 242,787.

This invention relates to means for the supporting and the maintaining in proper relation one to the other of a plurality of storage battery plates and terminals to be attached thereto while the terminals are being burned to the plates.

Storage batteries as now made are formed of a plurality of cells to give the desired total voltage, and in each cell there is positioned a plurality of plates, always of an uneven number, with a positive plate between a pair of negative plates. The prevailing numbers of plates employed in a single cell are in the combinations of 7, 11, 13, 15, 17, and 19. A further variable factor enters, in that two thicknesses of plates are supplied. The better batteries employ plates one-eighth of inch in thickness, while, to meet price competition, plates of three-thirty seconds of an inch are employed.

My invention is designed to handle all of these variable factors in one simple assembling device which may be made and supplied the battery building and repair trade at a very low cost.

One particular form of my invention is shown in the accompanying drawing, in which—

Fig. 1, is a front perspective view of the rack;

Fig. 2, a top plan view;

Fig. 3, a front elevation of the upper portion of the rack;

Fig. 4, an end elevation of the upper portion of the rack;

Fig. 5, a perspective view of a typical battery plate; and

Fig. 6, a front perspective view of a battery terminal.

Like characters of reference indicate like parts throughout the several views in the drawing.

I form a relatively heavy base 10 with a plurality of parallel V-shaped grooves 11 running transversely across the top side of the base, see Figs. 1 and 2. At near each of the two front corners of the base 10 I screw-threadedly attach thereto the two vertically positioned posts 12 and 13.

The upper ends of both posts 12 and 13 are each screw-threaded to have a nut 14 run down and stopped thereon to have the upper face of each nut at the same distance above the base 10. A lock-bar 15 is slidingly passed down over each upper end of the respective posts 12 and 13 to rest on the nut 14, and a rack plate 16, having a post hole in each end is positioned on the top sides of the lock-bars 15 with the upper ends of the posts 12 and 13 slidingly extended through the post holes.

A terminal locating plate 17 rests on the rack plate 16 and has longitudinal slots 18 and 19 in respective ends through which the post ends extend. A bar dam 20 rests on the forwardly extending lock-bars 15 and is carried snugly against the forward sides of both the rack plate 16 and the locating plate 17 by swinging the lock-bars 15 inwardly toward each other (see Fig. 2) whereby the vertical pin 21 carried on each bar 15 compressively contacts the dam 20.

Referring now to Figs. 1, 2, 5 and 6, the battery plate 22 is provided with an upwardly extending ear 23 at the side to which the terminal is to be attached, and the rack plate 16 is provided with a plurality of slots 24 cut back normally from the forward edge of the plate, each slot having a width just sufficient to slidingly receive therein the ear 23 of the battery plate.

The slots 24 are spaced at a uniform distance apart, this distance being equal to the combined thickness of a battery plate and two plate separators. The terminal locating plate 17 here shown has four openings 29, 30, 31, and 32 therethrough cut back from the forward edge for the reception of four terminals 26 (Fig. 6) whereby four plate assemblies may be assembled and burned at one setting of the rack. The terminal 26 has the vertical post 27 to which is affixed a base 28 substantially V-shaped with the apex of the V at the rear, and the locating plate 17 is similarly shaped so that the terminal may be positioned over the plates by placing the base 28 on the rack plate 16 within an opening through the locating plate 17 to have the apex of the base fitted back into the correspondingly shaped plate opening. As the ears 23 are presented within the locating plate 17 opening through the slots 24 just in front of the base 28, the operator may then proceed to burn the base 28 to the ears 23 and fill with lead the entire opening through the locating plate 17 as shown in Fig. 1.

Upon the solidifying of the lead the dam 20 is removed, and the plates 22 then attached to the terminal 26 may be slid out forwardly from the rack plate 16.

Particular attention is directed to the means for determining the number of slots 24 which appear through any one opening through the locating plate 17. Referring to Fig. 2, specifically to the opening 29, there are the six slots $24^a$, $24^b$, $24^c$ $24^d$, $24^e$, and $24^f$ appearing therein, and the transverse ends of the opening 29 are coincident with the outer edges of the slots $24^a$ and $24^f$. With this setting all four openings 29, 30, 31 and 32 are ready to receive six plates each, each of which six plates will make up the negative plates in an eleven plate cell.

Now to get the positive plate assembly, the locating plate 17 is slid over the rack plate 16 as indicated by the dash lines in Fig. 2 so that the slot $24^a$ is just covered over but the next slot 24 after $24^f$ is not uncovered. In this position, slots $24^b$, $24^c$ $24^d$, $24^e$, and $24^f$ appear through the opening 29, and similarly in each of the other openings, giving five slots to the opening. This setting gives the positive plate assembly for each cell of the eleven plate size, and by the locating means so described, these positive plates are so positioned in the assembly as to permit their being slipped one each between the two adjacent negative plates assembled as above described, with room for the necessary separators between all plates. In each setting of the locating bar 17, the bar is firmly held by tightening down the retaining nuts 35, which action secures in place all of the parts including the dam 20 against accidental displacement.

The locating plate 17 here described has openings therethrough for the eleven plate cell assemblies. For other assemblies, such as the seven, thirteen, etc., a different locating plate (not shown) is employed, there being a set of locating plates in which there is one locating plate each for the different number of battery plates to be assembled. For instance, for the seven plate assembly, the openings through the locating plate are reduced in length so that only a maximum of four slots 24 may appear through each of the openings, and three slots 24 when the locating plate is shifted for the positive plate assembly.

The foregoing description has applied to the use of the rack plate slots 24 which are for the thicker or one-eighth inch battery plates. Should the thinner battery plates be desired, the rack plate 16 is formed with a plurality of slots 39 cut normally back from the opposite edge (Fig. 2), each slot 39 being of a reduced width from the slots 24 to accommodate the thinner plate and the slots 39 are spaced equidistant one from the other to have a distance therebetwen equal to the combined thickness of one of the thin battery plates plus two of the plate separators. To use these slots 39, the rack plate 17 is merely turned over to present the slots 39 against the dam 20, with the slots 24 turned to the back and covered up under the locating plate 17.

The openings through the locating plate 17 will also be correct for use with the slots 39, whereby a positive plate assembly is made at one setting and a negative plate assembly is made by shifting the plate 17 as before. More slots 39 will of course be presented through an opening through the plate 17 than slots 24, and the proper locating plate is selected to give the desired opening, since for a given cell, there will be a thin battery plate assembly that may replace a thick plate assembly, the difference being in the total number of plates.

Having described my invention in the one particular form, I do not desire to be limited to the precise structure as shown, nor any more than may be necessitated by the following claims, since it is obvious that many structural changes may be made without departing from the spirit of the invention.

What I claim as new is:

1. In a device to assemble a terminal with a plurality of battery plates, a battery rack plate having a plurality of slots cut back from one edge, and a terminal locating plate slidably carried on the rack plate, said locating plate having a plurality of openings therethrough over said slots whereby a predetermined number of slots appear through each of said openings, and one less slot will appear in each opening upon sliding the locating plate longitudinally.

2. In a device to assemble a terminal with a plurality of battery plates, a battery rack plate having a plurality of slots cut back from one edge, and a terminal locating plate slidably carried on the rack plate, said locating plate having a plurality of openings therethrough over said slots whereby a predetermined number of slots appear through each of said openings, and one less slot will appear in each opening upon sliding the locating plate longitudinally and means for securing the locating plate in either of said positions.

3. In a device to assemble a terminal with a plurality of battery plates, a battery rack plate having a plurality of slots cut back from one edge, and a terminal locating plate slidably carried on the rack plate, said locating plate having a plurality of openings therethrough over said slots whereby a predetermined number of slots appear through each of said opening, and one less slot will appear in each opening upon sliding the locating plate longitudinally and a dam removably positioned to cover the slotted and opening sides of the rack plate and locating plate.

4. In a device to assemble a terminal with a plurality of battery plates, a battery rack plate having a plurality of slots cut back from one edge, and a terminal locating plate slidably carried on the rack plate, said locating plate having a plurality of openings therethrough over said slots whereby a predetermined number of slots appear through each of said openings, and one less slot will appear in each opening upon sliding the locating plate longitudinally and a dam removably positioned to cover the slotted and opening sides of the rack plate and locating plate, and releasable means compressing said dam against said rack plate and locating plate.

5. In a device to assemble a terminal with a plurality of battery plates, a battery rack plate having a plurality of slots cut back from one edge, and a terminal locating plate slidably carried on the rack plate, said locating plate having a plurality of openings therethrough over said slots whereby a predetermined number of slots appear through each of said openings, and one less slot will appear in each opening upon sliding the locating plate longitudinally, said plate openings being formed to hold a terminal to the rear of said slots.

6. In a device to assemble a terminal with a plurality of battery plates, a battery rack plate having a plurality of slots spaced equidistantly apart substantially the length of the rack plate, said slots opening along the forward edge of the rack plate, a terminal locating plate adapted to rest on and slide longitudinally over the rack plate, said locating plate having an opening therethrough cut back from its forward edge over said slots, said opening being formed at its rear side to fit about the base of a terminal, and said opening having a longitudinal width just sufficient to uncover an even number of said slots.

7. In a device to assemble a terminal with a plurality of battery plates, a battery rack plate having a plurality of slots spaced equidistantly apart substantially the length of the rack plate, said slots opening along the forward edge of the rack plate, a terminal locating plate adapted to rest on and slide longitudinally over the rack plate, said locating plate having an opening therethrough cut back from its forward edge over said slots, said opening being formed at its rear side to fit about the base of a terminal, and said opening having a longitudinal width just sufficient to uncover an even number of said slots and said opening uncovering an uneven number of slots upon sliding the locating plate longitudinally to cover one of said even slots.

8. In a device to assemble a terminal with a plurality of battery plates, a battery rack plate having a plurality of slots spaced equidistantly apart substantially the length of the rack plate, said slots opening along the forward edge of the rack plate, a terminal locating plate adapted to rest on and slide longitudinally over the rack plate, said locating plate having an opening therethrough cut back from its forward edge over said slots, said opening being formed at its rear side to fit about the base of a terminal, and said opening having a longitudinal width just sufficient to uncover an even number of said slots and said opening uncovering an uneven number of slots upon sliding the locating plate longitudinally to cover one of said even slots and means for removably securing the locating plate on the rack plate.

9. In a device to assemble a terminal with a plurality of battery plates, a battery rack plate having a plurality of slots spaced equidistantly apart substantially the length of the rack plate, said slots opening along the forward edge of the rack plate, a terminal locating plate adapted to rest on and slide longitudinally over the rack plate, said locating plate having an opening therethrough cut back from its forward edge over said slots, said opening being formed at its rear side to fit about the base of a terminal, and said opening having a longitudinal width just sufficient to uncover an even number of said slots and said opening uncovering an uneven number of slots upon sliding the locating plate longitudinally to cover one of said even slots and a dam removably secured along the forward side of the locating plate.

In testimony whereof I affix my signature.

HENRY E. von GRIMMENSTEIN.